United States Patent
Bales et al.

(10) Patent No.: US 11,781,436 B2
(45) Date of Patent: *Oct. 10, 2023

(54) HYBRIDIZED AIRFOIL FOR A GAS TURBINE ENGINE

(71) Applicant: Raytheon Technologies Corporation, Farmington, CT (US)

(72) Inventors: Daniel A. Bales, Avon, CT (US); Dmitri Novikov, Avon, CT (US); Robert C. Dolan, Coventry, CT (US); Eric W. Malmborg, Amston, CT (US); Steven T. Gordon, Glastonbury, CT (US)

(73) Assignee: RTX Corporation, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/571,202

(22) Filed: Jan. 7, 2022

(65) Prior Publication Data

US 2022/0127966 A1 Apr. 28, 2022

Related U.S. Application Data

(63) Continuation of application No. 16/530,917, filed on Aug. 2, 2019, now Pat. No. 11,248,477.

(51) Int. Cl.
*F01D 5/30* (2006.01)
*B23K 1/00* (2006.01)
(Continued)

(52) U.S. Cl.
CPC .......... *F01D 5/3061* (2013.01); *B23K 1/0018* (2013.01); *F01D 5/147* (2013.01);
(Continued)

(58) Field of Classification Search
CPC .. F01D 5/147; F01D 5/3061; B23K 2101/001
See application file for complete search history.

(56) References Cited

U.S. PATENT DOCUMENTS 2,675,208 A 4/1954 Weinberg
2,767,460 A 10/1956 Schultz
(Continued)

FOREIGN PATENT DOCUMENTS

CN 101418811 4/2009
DE 102011076082 11/2012
(Continued)

OTHER PUBLICATIONS

Blankenship, A.M. (2016) Elucidating the role of microstructure, texture, and microtexture on the dwell fatigue response of Ti—6Al—4V. Thesis. Wright State University. 2016. pp. 1-138.

(Continued)

*Primary Examiner* — Michael L Sehn
(74) *Attorney, Agent, or Firm* — Carlson, Gaskey & Olds, P.C.

(57) ABSTRACT

An airfoil for a gas turbine engine includes a first portion joined to a second portion along an interface such that at least the first portion establishes an airfoil section and the second portion establishes a root section. The airfoil section includes an airfoil body that extends between leading and trailing edges in a chordwise direction, between pressure and suction sides separated in a thickness direction, and from the root section to a tip portion in a spanwise direction. A recessed region extends inwardly from at least one of the pressure and suction sides. The airfoil body includes at least one rib that bounds a respective pocket within a perimeter of the recessed region. The recessed region and the at least one rib are dimensioned to extend across the interface. A cover (Continued)

skin is coupled to the airfoil body along the at least one rib to enclose the recessed region.

18 Claims, 11 Drawing Sheets

(51) Int. Cl.
*F01D 5/14* (2006.01)
*F04D 29/38* (2006.01)
*B23K 101/00* (2006.01)

(52) U.S. Cl.
CPC ...... *F04D 29/388* (2013.01); *B23K 2101/001* (2018.08); *F05D 2230/232* (2013.01); *F05D 2240/301* (2013.01)

(56) References Cited

U.S. PATENT DOCUMENTS

| | | | |
|---|---|---|---|
| 4,188,811 A | | 2/1980 | Brimm |
| 4,329,175 A | | 5/1982 | Turner |
| 5,063,662 A | | 11/1991 | Porter et al. |
| 5,269,058 A | | 12/1993 | Wiggs et al. |
| 6,039,542 A | | 3/2000 | Schilling et al. |
| 6,071,077 A | | 6/2000 | Rowlands |
| 7,021,899 B2 | | 4/2006 | Ferte et al. |
| 7,189,064 B2 | | 3/2007 | Helder et al. |
| 7,237,709 B2 | | 7/2007 | Beckford |
| 7,296,977 B2 | | 11/2007 | Bonnet |
| 7,322,723 B2 | | 1/2008 | Levers |
| 7,334,332 B2 | | 2/2008 | Ferte |
| 7,753,654 B2 | | 7/2010 | Read et al. |
| 7,993,105 B2 | | 8/2011 | Weisse et al. |
| 8,182,233 B2 | | 5/2012 | Goldfinch |
| 8,205,476 B2 | | 6/2012 | Voice |
| 8,256,118 B2 | | 9/2012 | Cammer |
| 8,267,663 B2* | | 9/2012 | Larose ............... B23K 20/1205 416/213 R |
| 8,585,368 B2 | | 11/2013 | Viens |
| 8,661,669 B2 | | 3/2014 | Andrews et al. |
| 9,010,166 B2 | | 4/2015 | Brennand |
| 9,121,287 B2 | | 9/2015 | Weisse et al. |
| 9,359,901 B2 | | 6/2016 | Evans et al. |
| 9,556,742 B2 | | 1/2017 | Parkin et al. |
| 9,657,577 B2 | | 5/2017 | Weisse |
| 9,790,800 B2 | | 10/2017 | Quigley |
| 9,869,191 B2* | | 1/2018 | Gallagher ............... F01D 1/023 |
| 2005/0044708 A1 | | 3/2005 | Lundgren et al. |
| 2012/0269642 A1 | | 10/2012 | Klemm |
| 2013/0039774 A1 | | 2/2013 | Viens et al. |
| 2014/0241897 A1 | | 8/2014 | Bales et al. |
| 2014/0271227 A1 | | 9/2014 | Radomski et al. |
| 2015/0125308 A1 | | 5/2015 | Radomski |
| 2015/0226068 A1 | | 8/2015 | Maurizio |
| 2016/0252104 A1 | | 9/2016 | Hui |
| 2016/0265365 A1 | | 9/2016 | Crowston |
| 2016/0305443 A1 | | 10/2016 | Schwarz et al. |
| 2017/0023009 A1 | | 1/2017 | Roche |
| 2017/0145837 A1 | | 5/2017 | Schloffer et al. |
| 2018/0318966 A1 | | 11/2018 | Evans et al. |
| 2019/0040744 A1 | | 2/2019 | Bales et al. |

FOREIGN PATENT DOCUMENTS

| | | |
|---|---|---|
| EP | 1481756 | 12/2004 |
| EP | 2727681 | 5/2014 |
| EP | 3153664 | 4/2017 |
| EP | 3205442 | 8/2017 |
| EP | 3453484 | 3/2019 |
| GB | 2073631 | 10/1981 |
| JP | S6326285 | 2/1988 |

OTHER PUBLICATIONS

European Search Report for European Patent Application No. 20187983.0 completed Dec. 18, 2020.

* cited by examiner

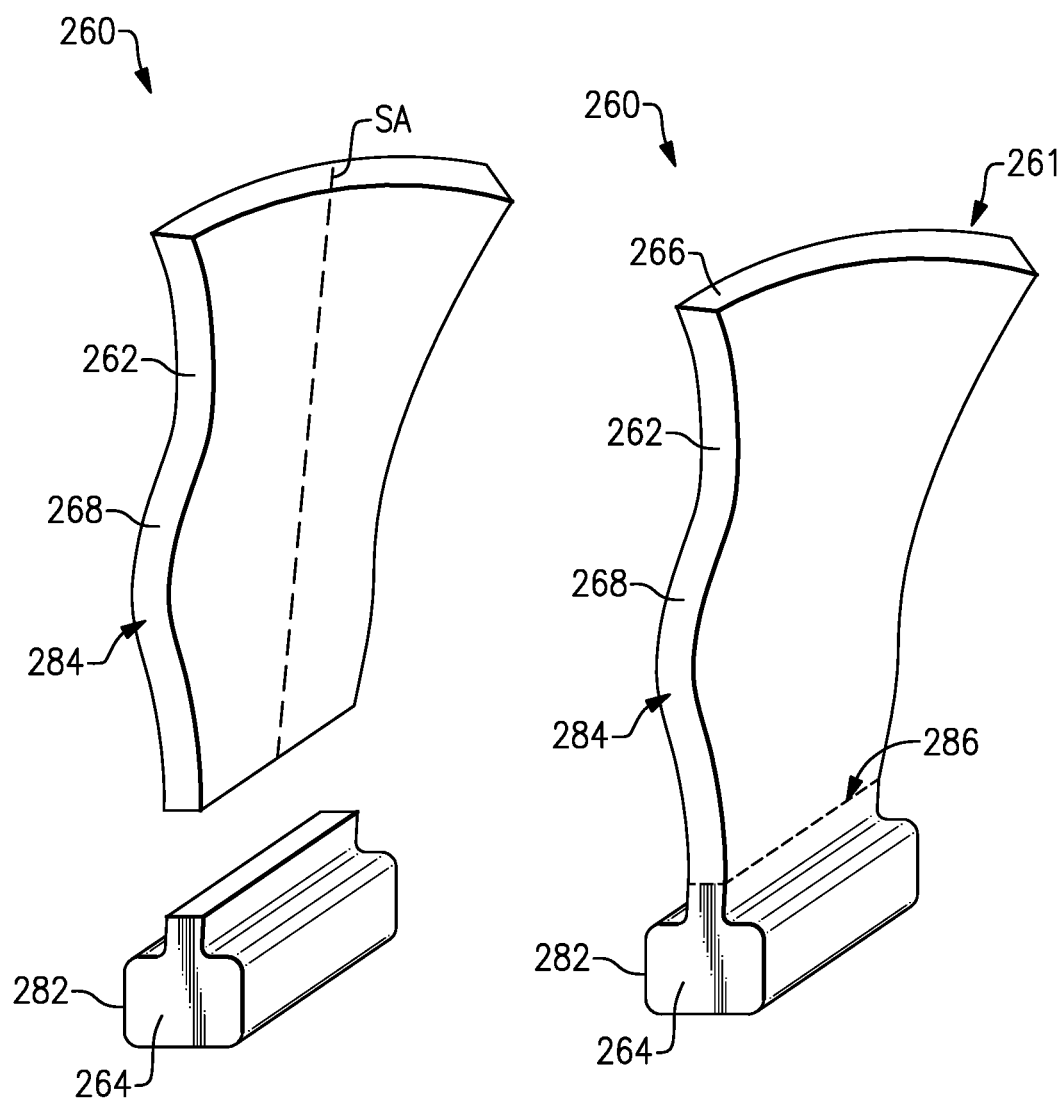

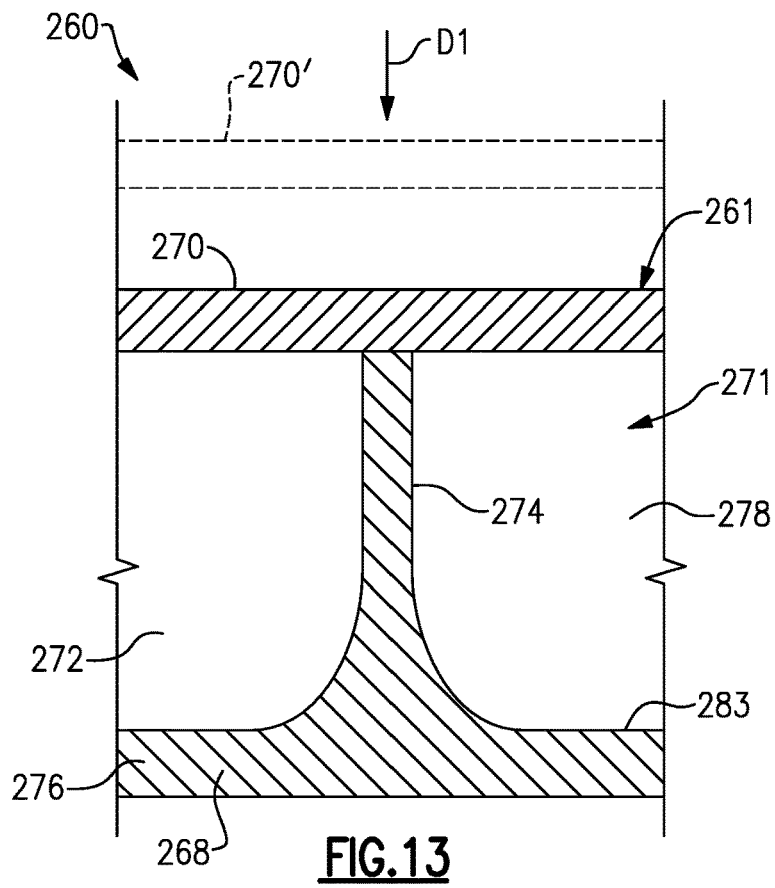
FIG.13
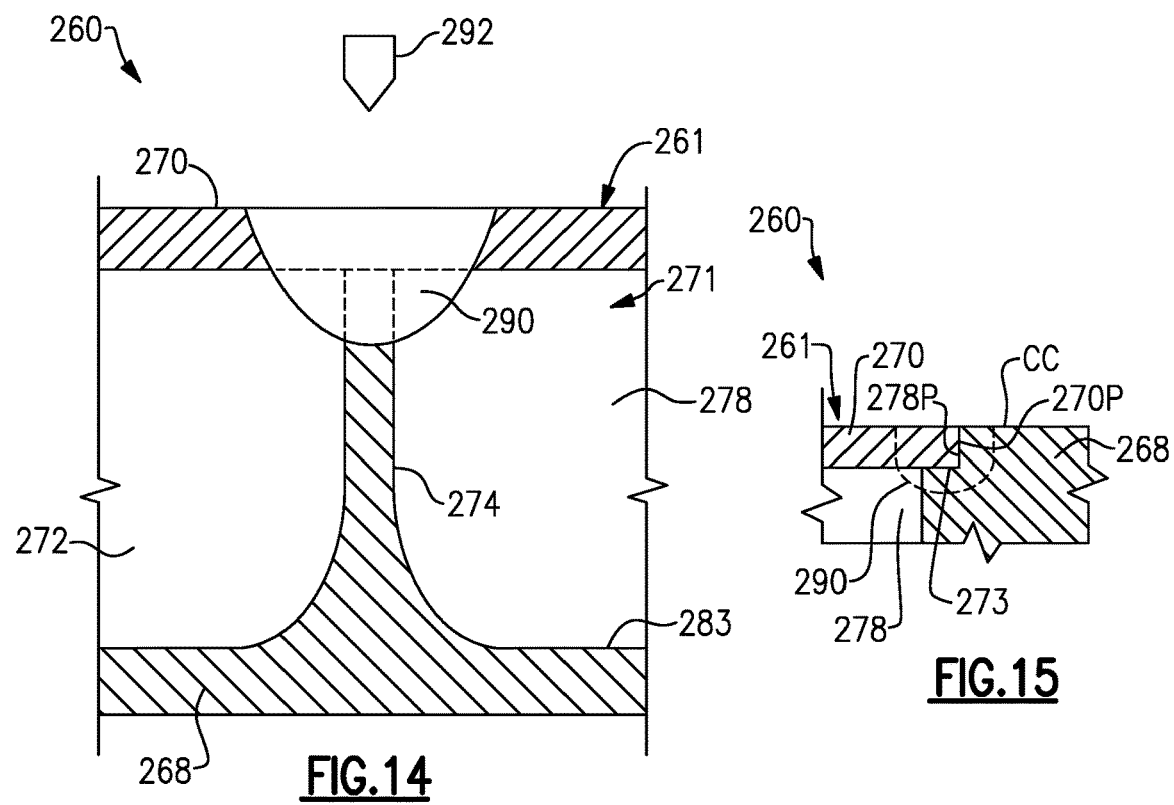
FIG.14
FIG.15

HYBRIDIZED AIRFOIL FOR A GAS TURBINE ENGINE

CROSS-REFERENCE TO RELATED APPLICATIONS

This disclosure is a continuation of U.S. patent application Ser. No. 16/530,917 filed Aug. 2, 2019.

BACKGROUND

This disclosure relates to a gas turbine engine, and more particularly to forming gas turbine engine components such as hollow airfoils.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

Some fans include hollow fan blades made of a metallic or composite material. Various techniques can be utilized to construct hollow fan blades, including attaching a cover to an airfoil body. The fan blades may have a root section mounted to a rotatable hub.

SUMMARY

An airfoil for a gas turbine engine according to an example of the present disclosure includes a first portion welded to a second portion along an interface such that at least the first portion establishes an airfoil section and the second portion establishes a root section mountable to a rotatable hub. The airfoil section includes an airfoil body extending between leading and trailing edges in a chordwise direction, extending between pressure and suction sides separated in a thickness direction, and extending from the root section in a spanwise direction to a tip portion. The tip portion defines a stagger angle relative to the root section, and the stagger angle is greater than or equal to 5 degrees, absolute, prior to welding the first portion to the second portion along the interface. A recessed region extends inwardly from at least one of the pressure and suction sides. The airfoil body includes at least one rib bounding a respective pocket within a perimeter of the recessed region. A cover skin is welded to the airfoil body along the at least one rib to enclose the recessed region.

In a further embodiment of any of the foregoing embodiments, the first portion is linear friction welded to the second portion along the interface.

In a further embodiment of any of the foregoing embodiments, the cover skin is welded to the airfoil body along the perimeter of the recessed region.

In a further embodiment of any of the foregoing embodiments, the at least one rib is a plurality of ribs bounding respective pockets within the perimeter of the recessed region.

In a further embodiment of any of the foregoing embodiments, the recessed region is dimensioned to extend across the interface.

In a further embodiment of any of the foregoing embodiments, the at least one rib is dimensioned to extend across the interface.

In a further embodiment of any of the foregoing embodiments, the first portion and the second portion are metallic.

In a further embodiment of any of the foregoing embodiments, the first portion has a first microstructure. The second portion has a second, different microstructure.

In a further embodiment of any of the foregoing embodiments, the stagger angle is greater than or equal to 15 degrees, absolute, prior to welding the first portion to the second portion along the interface.

In a further embodiment of any of the foregoing embodiments, the airfoil is a fan blade.

In a further embodiment of any of the foregoing embodiments, the first portion and the second portion are formed from wrought metal comprising titanium such that the first portion has a first microstructure and such that the second portion has a second, different microstructure. The stagger angle is greater than or equal to 10 degrees, absolute, and is less than or equal to 30 degrees, absolute, prior to linear friction welding the first portion to the second portion along the interface. The at least one rib is a plurality of ribs bounding respective pockets within the perimeter of the recessed region, and the plurality of ribs are spaced apart from each other and from the perimeter of the recessed region. The cover skin is welded to the airfoil body along the perimeter of the recessed region and along the plurality of ribs.

A gas turbine engine according to an example of the present disclosure includes a fan section that has a fan, a compressor section, a turbine section that drives the compressor section and the fan, and a plurality of airfoils. Each of the plurality of airfoils includes a first portion welded to a second portion along an interface such that at least the first portion establishes an airfoil section that has an airfoil body and the second portion establishes a root section. The first portion is dimensioned such that airfoil body is twisted along a spanwise axis to define a stagger angle prior to welding the first portion to the second portion along the interface. A cover skin is welded to the airfoil body to enclose a recessed region along one of the pressure and suction sides.

In a further embodiment of any of the foregoing embodiments, the fan includes a rotatable hub, and the root section of each of the plurality of airfoils is mounted to the hub.

In a further embodiment of any of the foregoing embodiments, the airfoil body includes a plurality of ribs bounding respective pockets within a perimeter of the recessed region. A cover skin is welded to the airfoil body along the plurality of ribs and along the perimeter to enclose the recessed region.

A method of forming an airfoil for a gas turbine engine according to an example of the present disclosure includes forming a first portion to establish an airfoil section that has an airfoil body, the airfoil body extending along a spanwise axis to a tip portion, forming a second portion to establish a root section, welding the first portion to the second portion along an interface, subsequent to twisting the airfoil body along the spanwise axis, such that the tip portion defines a stagger angle relative to the root section, forming a recessed region along a sidewall of the airfoil body, and welding a cover skin to the airfoil body to enclose the recessed region.

In a further embodiment of any of the foregoing embodiments, the step of welding the first portion to the second portion includes fusion welding the first and second portions along the interface.

In a further embodiment of any of the foregoing embodiments, the step of twisting the airfoil body includes hot forming the first portion such that the stagger angle is greater than or equal to 5 degrees, absolute. The step of forming the first portion includes establishing a first microstructure from wrought metal. The step of forming the second portion includes establishing a second, different microstructure from wrought metal.

A further embodiment of any of the foregoing embodiments includes forming a plurality of ribs in the airfoil body such that the recessed region is divided into a plurality of pockets each bounded by a respective rib of the plurality of ribs.

In a further embodiment of any of the foregoing embodiments, the step of welding the cover skin includes welding the cover skin to the plurality of ribs and to the perimeter of the recessed region, and the step of forming the recessed region occurs subsequent to the step of welding the first and second portions.

In a further embodiment of any of the foregoing embodiments, the airfoil is a fan blade.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 9 illustrate a first portion and a second portion of a component prior to joining.

FIG. 11 illustrates the component of FIG. 9 subsequent to joining the first and second portions.

FIG. 13 illustrates positioning a cover relative to a support rib according to an example.

FIG. 14 illustrates attaching the cover to the support rib of FIG. 13.

FIG. 15 illustrates attaching the cover to a shelf of the component of FIG. 13.

DETAILED DESCRIPTION

Figure 1:
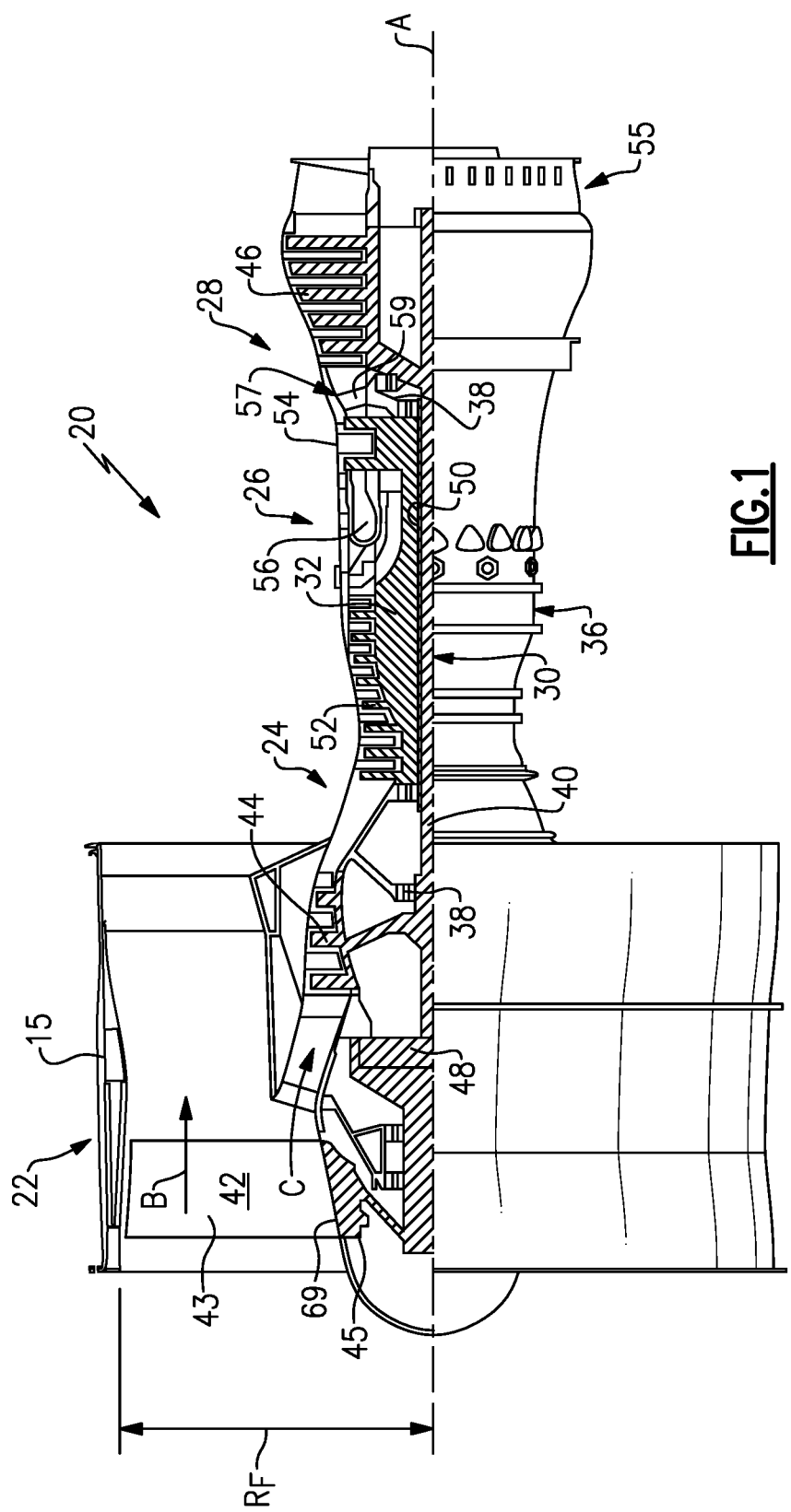
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
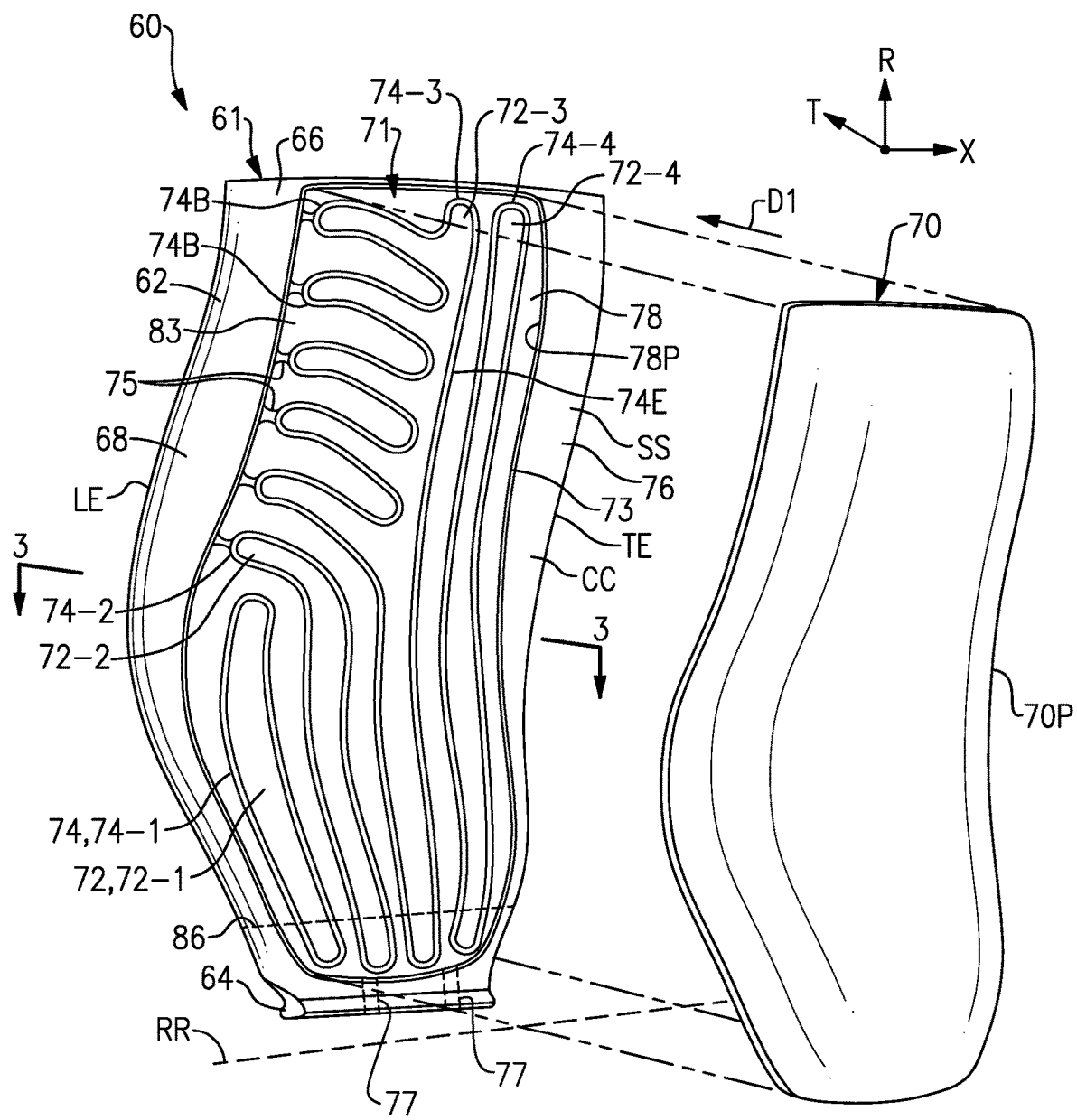
FIG. 2 illustrates a perspective view of a gas turbine engine component.
Figure 3:
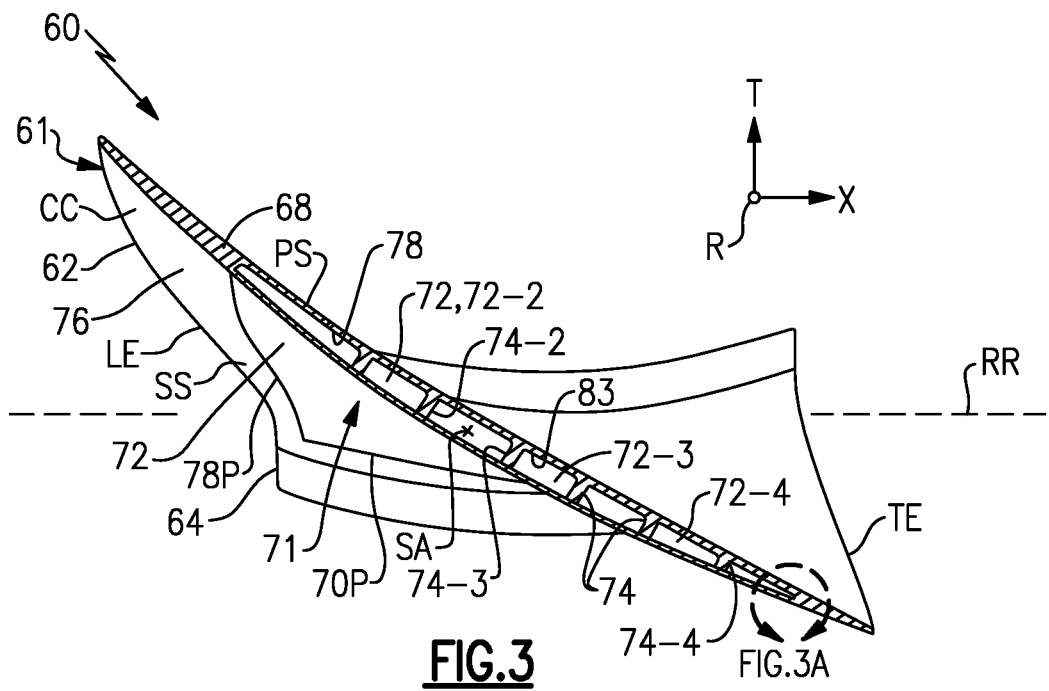
FIG. 3 illustrates a section view of the component taken along line 3-3 of FIG. 2.

FIGS. 2-3 illustrate a gas turbine engine component 60 according to an example. The component 60 can be incorporated in the gas turbine engine 20 of FIG. 1, for example. In the illustrated example of FIGS. 2-3, the component 60 is an airfoil 61. The airfoil 61 can be a fan blade 43 for the fan 42 of FIG. 1, for example. Other types of airfoils, including blades, vanes and struts in the fan, compressor and turbine sections 22, 24, 28, mid-turbine frame 57 and turbine exhaust case (TEC) 55 (FIG. 1) may benefit from the examples disclosed herein which are not limited to the design shown. Other parts of the gas turbine engine 20 may benefit from the examples disclosed herein, including industrial turbines.

The airfoil 61 includes an airfoil section 62 extending in a spanwise or radial direction R from a root section 64. The root section 64 is a shape that is configured to mount the fan blade 43 in the engine 20, such as a generally dovetail shape or geometry. The airfoil 61 is rotatable about an axis of rotation RR. The axis of rotation RR can be collinear or parallel to the engine axis A (FIG. 1). The root section 64 of each of the airfoils 61 is mountable to a rotatable hub, such as the rotatable hub 45 of the fan 42 of FIG. 1. The hub 45 is rotatable about the engine axis A to deliver airflow to the bypass and core flow paths B, C (FIG. 1). Generally, one side of the airfoil section 62 is a suction side SS and the other side is a pressure side PS (FIG. 3) separated in a thickness direction T. The pressure side PS has a generally concave profile, and the suction side SS has a generally convex profile. The airfoil section 62 extends in the thickness direction T between the pressure and suction sides PS, SS to define an aerodynamic surface contour CC of the airfoil section 62, as illustrated in FIG. 3.

The airfoil section 62 includes an airfoil (or main) body 68 that extends in the radial direction R from the root section 64 to a tip portion 66 (FIG. 2). The tip portion 66 establishes a terminal end of the airfoil 61. The airfoil body 68 extends in a chordwise direction X between a leading edge LE and a trailing edge TE. The airfoil body 68 extends between and defines at least one of the pressure and suction sides PS, SS. In the illustrated example of FIGS. 2 and 3, the airfoil body 68 defines both the pressure and suction sides PS, SS.

The airfoil 61 includes a cover or cover skin 70 disposed on a surface of the airfoil body 68 and is arranged to provide a continuous surface with the suction side SS of the airfoil 61, as illustrated by FIG. 3. In another example, the cover skin 70 is disposed on the pressure side PS of the airfoil 61. The cover skin 70 is shown in an uninstalled position in FIG. 2 for illustrative purposes. The component 60 can include two or more cover skins 70 along each of the pressure and/or suction sides PS, SS of the airfoil section 62.

The airfoil body 68 and cover skin 70 can be made out of metallic materials such as titanium or aluminum. Other materials for the airfoil body 68 and cover skin 70 can be utilized, including metals or alloys and metal matrix composites.

Figure 3A:
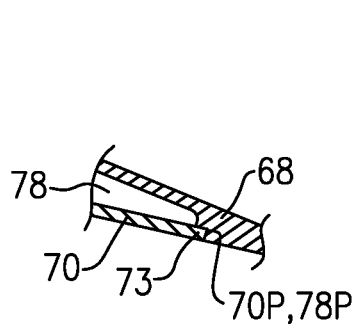
FIG. 3A illustrates selected portions of the component of FIG. 3.

A sidewall 76 of the main body 68 defines a recessed region 78 that is dimensioned to at least partially receive the cover skin 70. The recessed region 78 extends inwardly from at least one of the pressure and suction sides PS, SS defined by the sidewall 76, such as the suction side SS as illustrated in FIGS. 2-3. The main body 68 defines a shelf 73 along a perimeter 78P of the recessed region 78, as illustrated by FIG. 2. The shelf 73 is dimensioned to at least partially receive and mate with a perimeter 70P of the cover skin 70, as illustrated in FIG. 3A.

The sidewall 76 of the airfoil body 68 includes a rib pattern 71 having one or more support ribs 74 that divide the recessed region 78 into, or otherwise define, a plurality of internal cavities or pockets 72 within the perimeter 78P of the recessed region 78 along the airfoil section 62. In the illustrated example of FIG. 2, the sidewall 76 defines four separate and distinct pockets 72 (indicated at 72-1 to 72-4) bounded by respective support ribs 74 within the perimeter 78P of the recessed region 78. The airfoil 61 can include fewer or more than four internal pockets 72, such as only one internal pocket 72. Each internal pocket 72 can be defined having different dimensions, shapes and at other orientations than illustrated in FIGS. 2 and 3. The internal pockets 72 can be substantially or completely free of any material such that the airfoil section 62 is hollow. The pockets 72 can serve to reduce an overall weight of the component 60. In other examples, the pockets 72 are at least partially filled with material, such as rubber-based damping material. The damping material can be inserted through one or more vent holes 77 (shown in dashed lines in FIG. 2 for illustrative purposes), following all elevated temperature processing.

The support ribs 74 are dimensioned to abut against and support adjacent portions of the cover skin 70. In the illustrative example of FIG. 2, the airfoil body 68 includes four ribs 74 (indicated at 74-1 to 74-4) distributed along the recessed region 78. Each rib 74-1 to 74-4 is dimensioned to substantially loop about and enclose a respective one of the internal pockets 72-1 to 72-4 within the perimeter 78P of the recessed region 78. The support ribs 74 can be spaced apart from each other and from the perimeter 78P of the recessed region 78. The substantially continuous, closed loop pockets 72 and ribs 74 can reduce stress concentrations in the component 60.

The ribs 74 can have various shapes or profiles. For example, ribs 74-1 and 74-4 have a generally elongated, oblong or racetrack shaped geometry or profile. Rib 74-2 has a generally L-shaped geometry or profile. Other geometries can include a complex profile. In the illustrative example of FIG. 2, rib 74-3 has a generally serpentine geometry or profile having two or more (e.g., twelve) undulations of greater than 90 degrees in alternating directions that define one or more branched sections 74B extending from an elongated section 74E. Rib 74-3 includes five branched segments 74B establishing the serpentine profile, with the branched sections 74B each having a major component extending in the chordwise direction X from the elongated section 74E towards the leading edge LE. It should be appreciated that the rib pattern 71 can include serpentine ribs 74 having fewer or more than five branched segments 74B, such as six or seven branched segments 74B. Serpentine rib 74-3 is positioned between and dimensioned to space apart ribs 74-1, 74-2 from rib 74-4. The component 60 can include fewer or more than four ribs 74, and the ribs 74 can be defined having different dimensions, shapes and at other orientations than illustrated in FIG. 2. For example, at least some of the ribs 74 can have a generally circular, elliptical, rectangular and triangular geometries. The serpentine arrangement of rib 74-3 and the substantially continuous, closed loop pockets 72 disclosed herein can reduce stress concentrations in the component 60 and can minimize or otherwise reduce weld start/stop locations and weld distortion.

The cover skin 70 can be attached to the support ribs 74 utilizing any of the techniques disclosed herein, including laser or electron beam welding, brazing, diffusion bonding or other fastening techniques. For example, the cover skin 70 can be welded to the airfoil body 68 along the support rib(s) 74 and/or the perimeter 78P to enclose the recessed region 78.

Figure 3B:
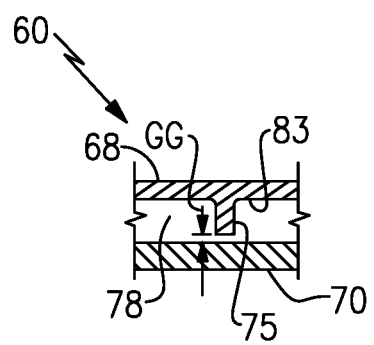
FIG. 3B illustrates a sectional view of a stiffening rib within the component of FIG. 3.

The rib pattern 71 can include a plurality of stiffening ribs 75 (FIG. 2) defined in the main body 68. The stiffening ribs 75 extend from the support ribs 74 and/or perimeter 78P of the recessed region 78. In the illustrative example of FIG. 2, the stiffening ribs 75 are generally linear or curvilinear and interconnect the support ribs 74 with the perimeter 78P of the recessed region 78. The stiffening ribs 75 are dimensioned to extend outwardly from a floor 83 of the recessed region 78, and at least some of the stiffening ribs 75 can be spaced apart from the cover skin 70 to define a gap GG when in an assembled position, as illustrated by rib 75 of FIG. 3B. The stiffening ribs 75 can serve to provide rigidity or stiffening to the main body 68, and can be dimensioned to allow the main body 68 to flex to absorb impacts from foreign objection debris (FOD), which can reduce strain along weld joints between the ribs 74 and cover skin 70. In other examples, the stiffening ribs 75 are omitted.

Figure 4:
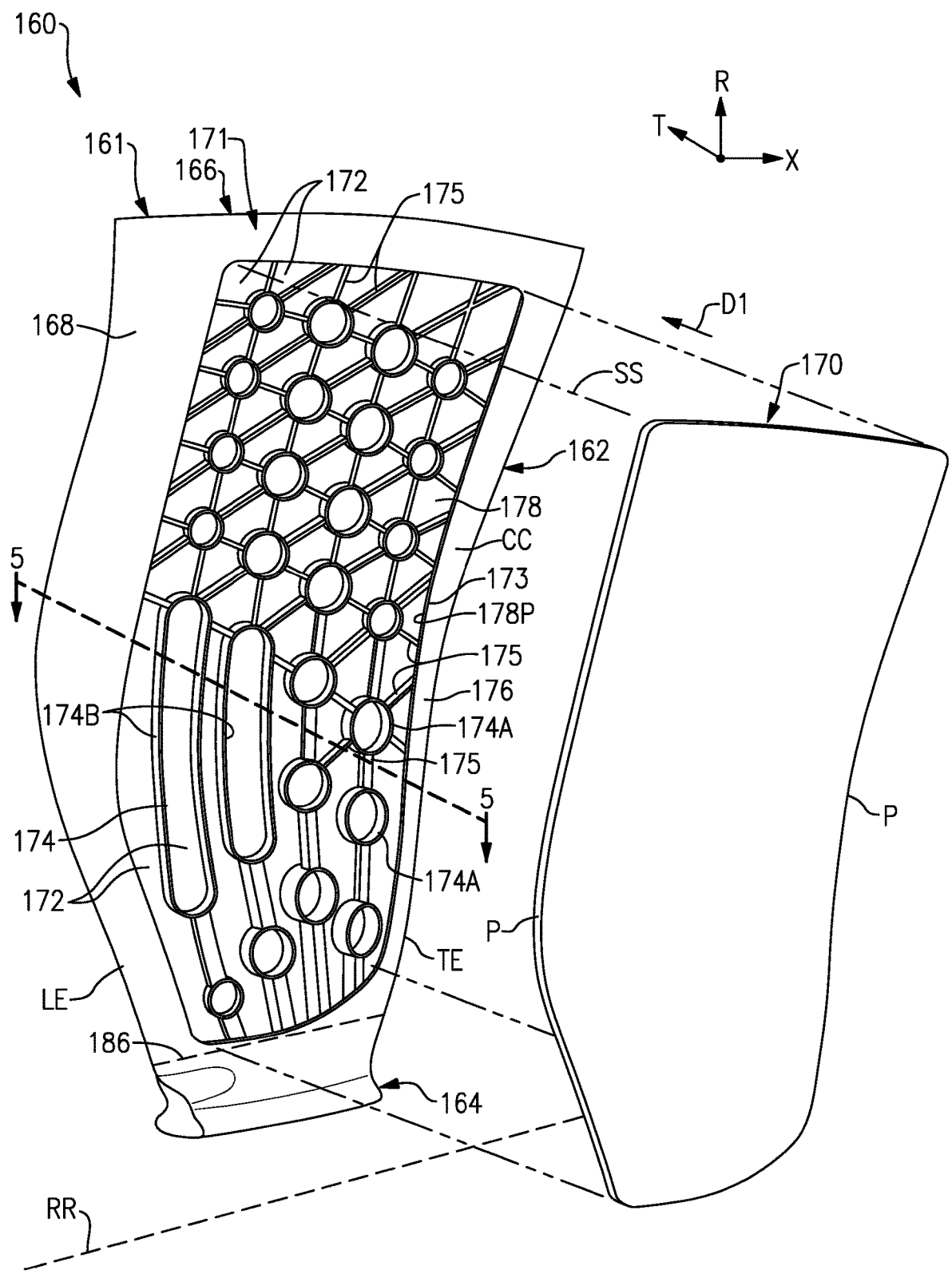
FIG. 4 illustrates a perspective view of a gas turbine engine component according to another example.
Figure 5:
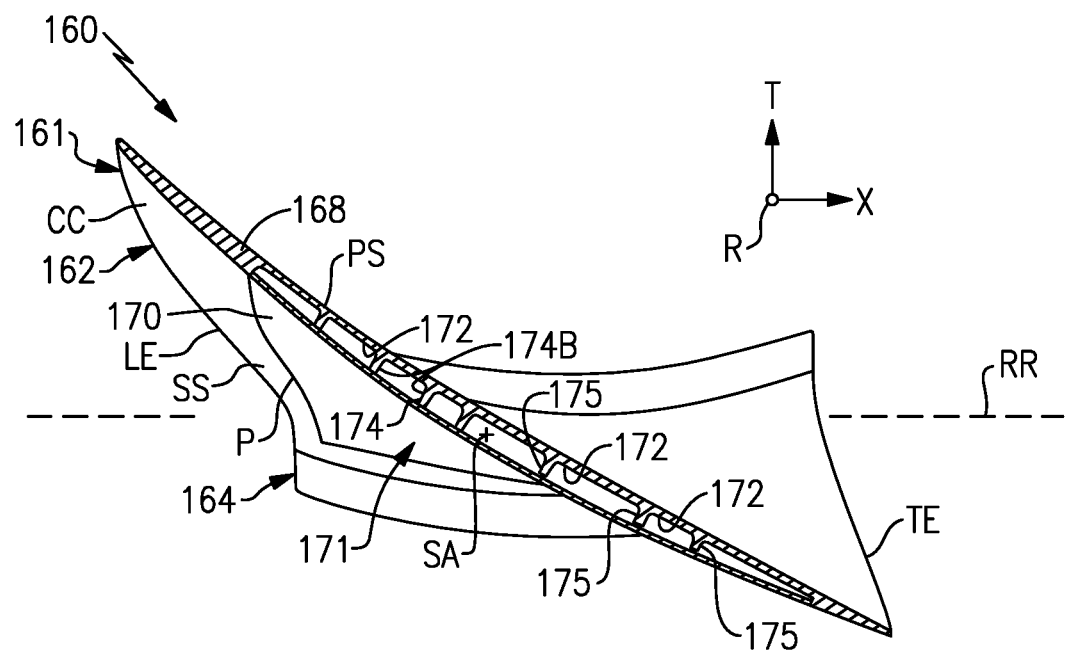
FIG. 5 illustrates a section view of the component taken along line 5-5 of FIG. 4.

FIGS. 4-5 illustrate a gas turbine engine component 160 according to another example. In this disclosure, like reference numerals designate like elements where appropriate and reference numerals with the addition of one-hundred or multiples thereof designate modified elements that are understood to incorporate the same features and benefits of the corresponding original elements. The component 160 includes a rib pattern 171 including support ribs 174 and stiffening ribs 175. In the illustrated example of FIG. 4, ribs 174A have a generally circular or otherwise elliptical geometry, and ribs 174B have generally elongated, oblong or racetrack shaped geometry. Stiffening ribs 175 are generally linear or curvilinear. Ribs 174A, 174B can be attached to cover skin 170 utilizing any of the techniques disclosed herein. At least some of the stiffening ribs 175 can be spaced apart from the cover skin 170, as illustrated by ribs 175 of FIG. 5.

Figure 6:
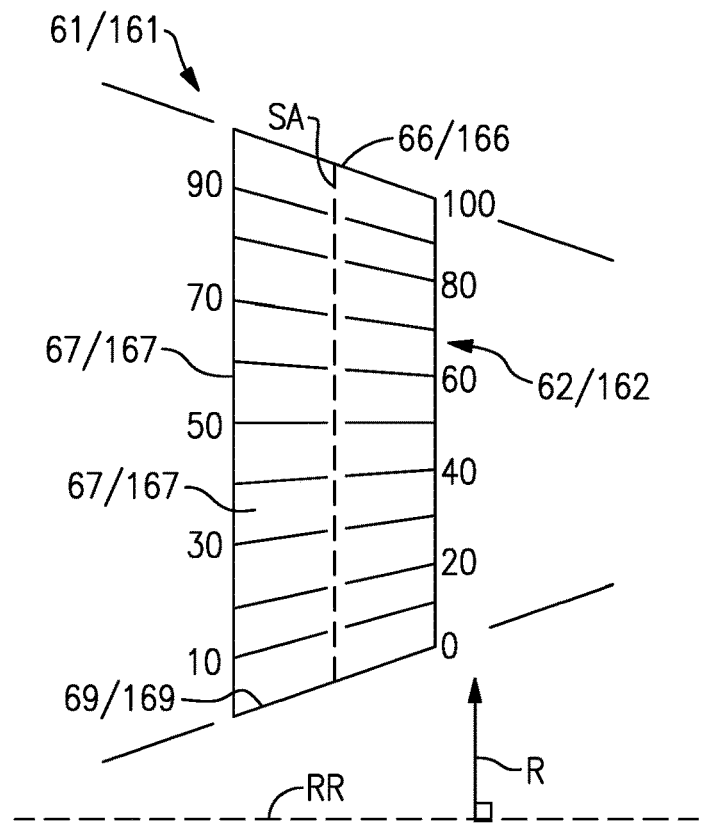
FIG. 6 is a schematic view of airfoil span positions.

Referring to FIG. 6, span positions of the airfoil section 62/162 are schematically illustrated from 0% to 100% in 10% increments to define a plurality of sections 67/167. Each section 67/167 at a given span position is provided by a conical cut that corresponds to the shape of segments a flowpath (e.g., bypass flowpath B or core flow path C of FIG. 1), as shown by the large dashed lines. In the case of an airfoil 61/161 such as with an integral platform 69/169, the 0% span position corresponds to the radially innermost location where the airfoil section 62/162 meets the fillet joining the airfoil 61/161 to the platform 69/169 (see also FIG. 1 illustrating platform 69). In the case of an airfoil 61/161 without an integral platform, the 0% span position corresponds to the radially innermost location where the discrete platform 69/169 meets the exterior surface of the airfoil section 62/162. A 100% span position corresponds to a section of the airfoil section 62/162 at the tip portion 66/166.

Each airfoil 61/161 extends in the radial direction R to establish a radius RF of the fan 42 relative to the engine axis A in an installed position (FIG. 1). In examples, the radius RF of the fan 42 is greater than or equal to approximately 80 inches, or more narrowly greater than or equal to 100 inches. For the purposes of this disclosure, the terms "substantially" and "approximately" mean±3 percent of the respective value unless otherwise stated. Utilizing the techniques disclosed herein, a three-dimensionally twisted forging can be utilized to form the airfoils 61/161, for example, which can reduce manufacturing complexity.

Figure 7:
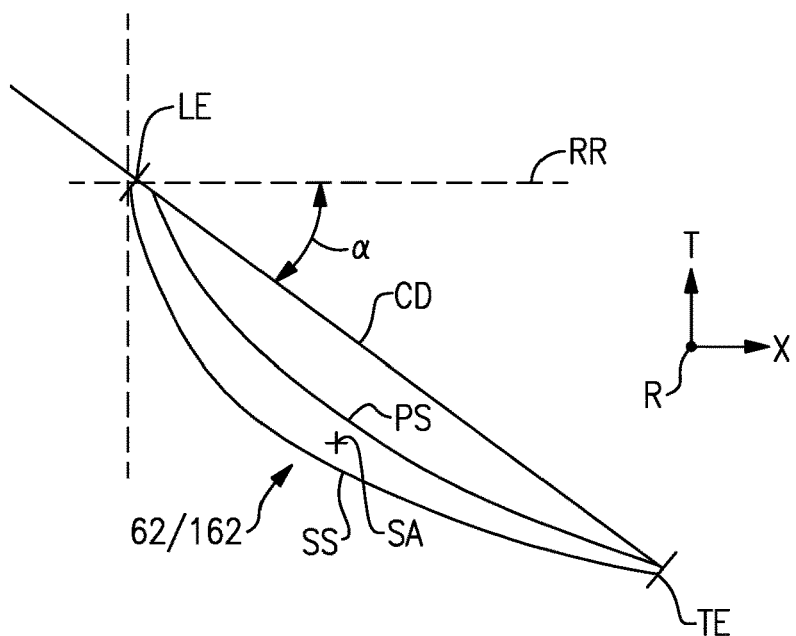
FIG. 7 is a schematic view of an airfoil depicting a stagger angle at a span position of FIG. 6.

Referring to FIG. 7, with continuing reference to FIG. 6, the airfoil section 62/162 is sectioned at a radial position between the root section 64/164 and tip portion 66/166. In examples, each airfoil section 62/162 is specifically twisted about a spanwise axis SA (see also FIGS. 3 and 5) in the radial direction R with a corresponding stagger angle α at each span position. The spanwise axis SA can have a major component that extends in the spanwise or radial direction R. Chord CD, which is a length between the leading and trailing edges LE, TE, forms the stagger angle α relative to the chordwise direction X or a plane parallel to the axis or rotation RR.

The stagger angle α can vary along the span of the airfoil section 62/162 to define a twist, and the airfoil section 62/162 can be three-dimensionally twisted about the spanwise axis SA. For example, the tip portion 66/166 can define a stagger angle α relative to the root section 64/164 that is greater than or equal to 5 degrees or 10 degrees, absolute. In examples, the tip portion 66/166 define a stagger angle α relative to the root section 64/164 that is greater than or equal to 15 degrees, absolute. In some examples, the stagger angle α at the tip portion 66/166 relative to the root section 64/166 is between 5-60 degrees, absolute, or more narrowly between 10-30 degrees, absolute, such that the airfoil section 62/162 is twisted about the spanwise axis SA as illustrated by the airfoils 61, 161 of FIGS. 3 and 5. In the illustrative example of FIG. 2, the rib pattern 71 and recessed region 78 extend inwardly of at least 5% span and extend outwardly of at least 95% span. In the illustrative example of FIG. 4, the rib pattern 171 and recessed region 178 extend inwardly of at least 10% span and extend outwardly of at least 90% span.

Figure 8:
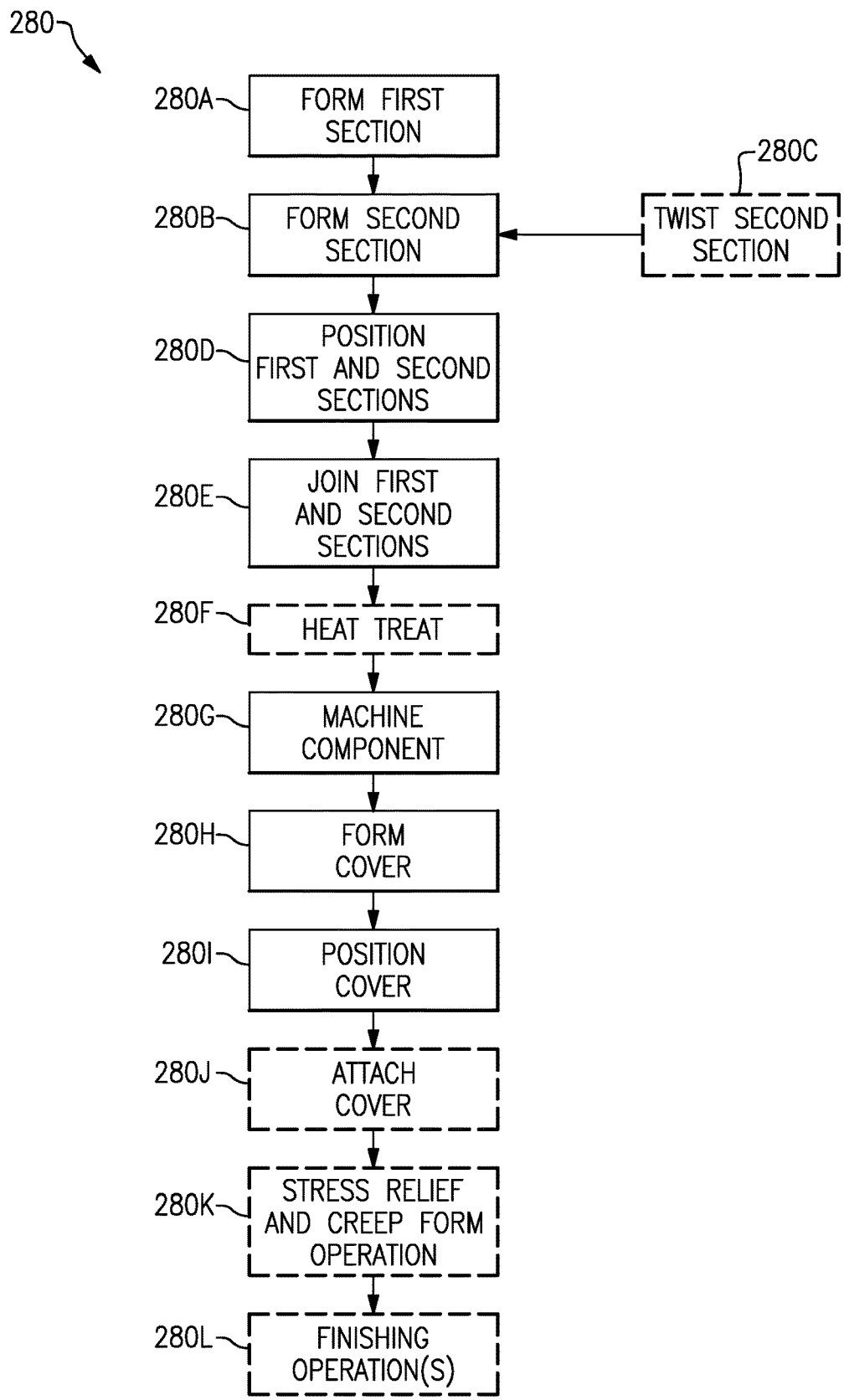
FIG. 8 illustrates a process for forming a gas turbine engine component.

FIG. 8 illustrates a process of constructing or forming a gas turbine engine component in a flow chart 280. The process can be utilized to form a hybrid component, including a hollow component such as the airfoils 61/161 of FIGS. 2-5, the fan blades 43 of engine 20, another component such as a solid airfoil, or another component of the engine 20 including static vanes and struts, for example. Reference is made to the components 60, 160 of FIGS. 2-5 and component 260 of FIGS. 9-15 for illustrative purposes.

Referring to FIGS. 8-9, a first (or second) portion 282 of a component 260 is prepared or otherwise formed to establish a root section 264 at step 280A. Step 280A can include machining bar stock to establish the root section 264. The bar stock can have a generally rectangular or elliptical cross sectional geometry.

Figure 10A:
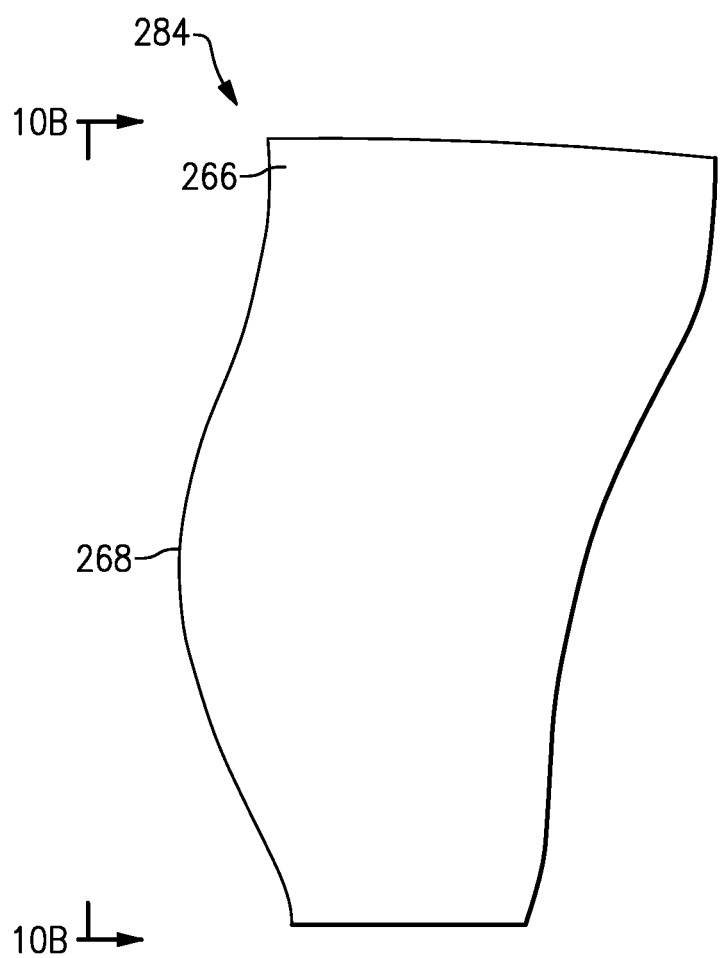
FIG. 10A illustrates a side view of the second portion of FIG. 9 subsequent to a shaping operation.

A second (or first) portion 284 of the component 260 is prepared or otherwise formed to establish an airfoil section 262 including a main (or airfoil) body 268 at step 280B. Step 280B can include cutting a flat or planar plate to establish a generally airfoil shaped geometry or profile, as illustrated by FIG. 10A.

The first and second portions 282, 284 can be made of various materials and can have various constructions. The portions 282, 284 can be have different material properties to establish a hybridized component, with the respective material properties tailored or selected with respect to expected operating conditions and environments of the engine 20, including expected loads and stresses on the portions 282, 284. In examples, the portions 282, 284 are metallic and comprise titanium or aluminum. Steps 280A, 280B can including forming the portions 282, 284 from wrought metal such that the first portion 282 establishes a first microstructure and such that the second portion 282 establishes a second microstructure, which can be the same or can differ from the first microstructure. The wrought metal can comprising titanium or aluminum, for example. The first and second microstructures can differ with respect to rolling direction, grain size and/or texture, for example. For the purposes of this disclosure, the term "texture" can be microtexture, macrotexture, or a combination thereof, and means the distribution of crystallographic orientations of a material, with fully random orientations in the material having no distinct texture. Forming the respective microstructures disclosed herein relative to texturing can increase fatigue life, by as much as approximately 6-10 times or more over formation of components in which texturing is not specifically addressed, and can increase durability of the airfoil section 262 and root section 264. One would understand how to determine the rolling direction, grain size and texture of a material in view of the teachings disclosed herein. Other techniques can be utilized to form the first and/or second portions 282, 284, such as forging, casting, machining, or additive manufacturing.

Figure 10B:
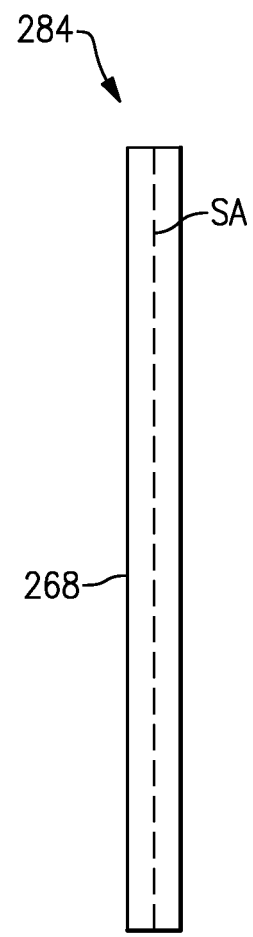
FIG. 10B illustrates an end view of the second portion of FIG. 10A.

Step 280B can include twisting the second portion 284 to form the airfoil section 262 such that the main body 268 has a generally twisted shape or profile at step 280C, as illustrated in FIG. 9. The portion of the main body 268 established by the second portion 284 can have a substantially flat or planar profile along spanwise axis SA prior to the twisting at step 280C, as illustrated by FIG. 10B. Step 280C can include twisting the second portion 284 about the spanwise axis SA with respect to a predefined stagger angle, including any of the stagger angles disclosed herein. Various techniques can be utilized to twist the second portion 284, such as a hot forming operation of the relatively flat or planar plate of FIGS. 10A-10B. Other techniques can be utilized to form a contoured main body 268, including forging and additive manufacturing techniques such as non-powder additive wire, additive powder, forged additive wire, and additive powder techniques. In examples, step 280B includes hot isostatic pressing (HIP) the additively manufactured component. Applying a HIP operation to the section portion 284 can be utilized to densify the microstructure of the section portion 284. In examples, the second portion 284 is thermally treated subsequent to the twisting to stress relieve the second portion 284.

The first and second portions 282, 284 are positioned relative to each other in preparation for joining the portions 282, 284 together at step 280D. Step 280D can include positioning and holding the sections 282, 284 in tooling. Step 280D can occur subsequent to twisting the second portion 284 at step 280C.

Referring to FIGS. 8 and 11, with continuing reference to FIG. 9, the first and second portions 282, 284 are joined together along an interface 286 to establish the component 260 at step 280E. The portions 282, 284 are joined together to establish the airfoil 261 including the airfoil section 262 extending from the root section 264. The airfoil 261 can be utilized to form one of the airfoils 61, 161 of FIGS. 2-5, for example. The first and second portions 282, 284 are separate and distinct components prior to being joined together at step 280E.

Various techniques can be utilized to join the first and second portions 282, 284, including welding the portions 282, 284 together along the interface 286. Example welding techniques include power beam welding (e.g., laser or electron beam) and non-fusion welding such as linear friction welding (LFW) the portions 282, 284 along the interface 286. A LFW technique can be utilized to expulse material along the interface 286 that may deviate from predetermined design characteristics of the component 260, which can produce a relatively high integrity weld.

The first portion 282 is welded or otherwise joined to the second portion 284 along the interface 286 such that the first portion 282 establishes the root section 264 and at least the second portion 284 establishes the airfoil section 262 including the airfoil body 268. In some examples, the portions 282, 284 cooperate to establish respective portions of the airfoil body 268, as illustrated by the airfoil section 62 and root section 64 joined along the interface 86 in FIG. 2.

Figure 12:
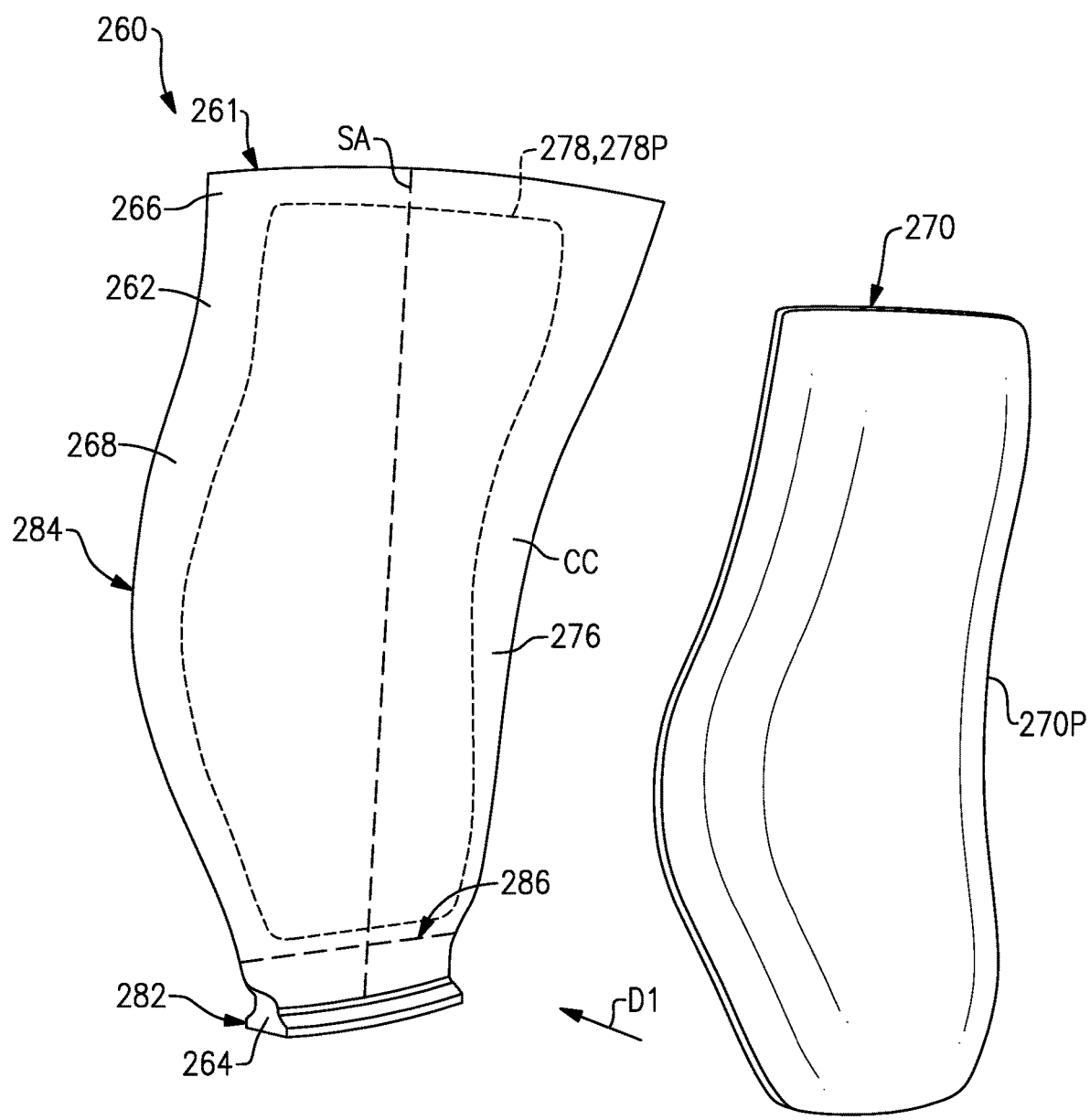
FIG. 12 illustrates the component of FIG. 11 subsequent to a shaping operation.

The second portion 284 can be dimensioned such that airfoil body 268 is twisted along the spanwise axis SA to define a stagger angle at step 280C prior to welding or otherwise joining the portions 282, 284 along the interface 286 at step 280E, as illustrated in FIG. 9 (see also FIG. 12). In examples, the stagger angle is greater than or equal to 5, 10 or 15 degrees, absolute, prior to welding or otherwise joining the first portion 282 to the second portion 284 along the interface 286. The stagger angle can be less than or equal to 30 degrees, absolute, prior to welding or otherwise joining the first portion 282 to the second portion 284 along the interface 286. The main body 268 can be twisted along the spanwise axis SA prior to step 280E such that a tip portion 266 of the airfoil 261 defines a stagger angle relative to the root section 264 in response to joining the portions 282, 284.

The component 260 can be heat treated at step 280F subsequent to joining the portions 282, 284 at step 280E. Step 280F can include heating the component 260 to a predetermined temperature threshold for a predetermined duration, such as approximately 1100 degrees Fahrenheit for at least 6 hours.

Referring to FIGS. 8 and 12, with continuing reference to FIG. 11, the airfoil section 262 and root section 264 can be shaped or formed with respect to a predefined geometry or contour, which can be defined with respect to one or more design criterion. The component 260 can be machined at step 280G with respect to the one or more design criterion. In examples, step 280G occurs subsequent to welding or otherwise joining the portions 282, 284 at step 280E. In other examples, one or more aspects of step 280G occur prior to step 280E. Step 280G can include mounting the component 260 to tooling and machining internal and/or external surfaces of the airfoil section 262 and/or root section 264 with respect to the predefined geometry with the weld flashing removed along the interface 286. The component 260 can be machined to define an aerodynamic external surface contour CC, such as the aerodynamic external surface contour CC of the airfoil section 62/162 of component 60/160 (FIGS. 2-5) characterized by a three-dimensional twist. The first portion 282 can be machined such that the root section 264 has a generally dovetail geometry, as illustrated in FIG. 12.

Step 280G can include forming or otherwise defining one or more surface features in a sidewall 276 of the main body 268. The component 260 can be formed to include any of the surface features disclosed herein. In the illustrated examples of FIGS. 2-5, the surface features include the recessed region 78/178, shelf 73/173, pockets 72/172, and rib pattern 71/171 including support and stiffening ribs 74/174, 75/175 distributed along the sidewall 76/176 of the main body 68/168.

Recessed region 278 (shown in dashed lines for illustrative purposes) can be dimensioned relative to the interface 286. In examples, the recessed region is dimensioned such that the recessed region is spaced apart from the interface, as illustrated by the recessed region 178 and interface 186 of FIG. 4 and the recessed region 278 and interface 286 of FIG. 12. In other examples, the recessed region is dimensioned such that the recessed region extends across the interface, as illustrated by the recessed region 78 and interface 86 of FIG. 2. In the illustrative example of FIG. 2, at least one rib 74 is dimensioned to extend across the interface 86. The interface 86 can be established at a distance of approximately 2-3 inches away from the root section 64, for example.

At least one cover (or cover skin) 270 is formed at step 280H. The cover 270 can be forged, machined or produced by additive manufacturing from a metal or metal alloy, for example. In examples, the cover 270 is formed from a sheet metal body having a substantially planar geometry. The cover 270 can have a third microstructure that is the same or differs from the first and/or second microstructure of the first and section portions 282, 284.

Forming the cover 270 can include contouring, permanently reshaping or otherwise dimensioning the cover 270 according or with respect to an external surface contour or profile of the main body 268 of the component 260, such as the external surface contour CC of the airfoil sections 62, 162 of FIGS. 2-5. Various techniques can be utilized to contour the cover 270, including hot forming and machining. The cover 270 can be contoured with respect to a stagger angle of the respective airfoil 261 that is twisted to define the predefined contour CC, including any of the stagger angles disclosed herein, as illustrated by the airfoils 61, 161 of FIGS. 2-5.

Forming the cover 270 occurs such that a perimeter 270P of the cover 270 is dimensioned to mate with a perimeter 278P of the recessed region 278 (shown in dashed lines for illustrative purposes), as illustrated by the cover skins 70, 170 of FIGS. 3 and 5 and cover 270 of FIG. 15. In an installed position, the external surface contour CC of the main body 268 and external surfaces of the cover 270 can cooperate to define a pressure side or a suction side of an airfoil, as illustrated by the cover skins 70, 170 of FIGS. 3 and 5. Step 280H can include chemically milling the cover 270 with respect to a predefined cover geometry and can include cleaning the cover 270 to remove surface contaminants using a laser cleaning technique, for example.

Referring to FIGS. 8 and 13, the cover 270 is positioned relative to the main body 268 at step 280I. Step 280I can include moving cover 270' (shown in dashed lines for illustrative purposes) in direction D1 (see also FIG. 12) and into abutment with each adjacent rib 274 to enclose respective ones of the pockets 272, and also as illustrated by the cover skins 70, 170 and ribs 74, 174 of FIGS. 3 and 5.

Referring to FIGS. 8 and 14, the cover 270 is attached to the main body 268 at step 280J. Step 280J can include mechanically attaching surfaces of the cover 270 to surfaces of the main body 268 along the respective rib 274 subsequent to positioning the cover 270. Various techniques can be utilized to mechanically attach the cover 270 to the main body 268, including any of the techniques disclosed herein. The main body 268 can be mounted in a welding fixture, for example. The cover 270 is positioned relative to the main body 268 and held against the main body 268 such that the ribs 274 directly abut against the cover 270. The cover 270 is welded to the main body 268 along the rib(s) 274 with a welding system 292 to enclose the recessed region 278. Welding the cover 270 to the rib 274 establishes a weldment 290 along a respective weld path.

Referring to FIGS. 8 and 15, step 280J can include mechanically attaching the perimeter 270P of the cover 270 to a shelf 273 defined by the main body 268 along the perimeter 278P of the recessed region 278. Various techniques can be utilized to mechanically attach the perimeter 270P of the cover 270 to the shelf 273 of the main body 268, including any of the techniques disclosed herein. Welding the perimeter 270P of the cover 270 to the shelf 273 establishes a weldment 290 along a respective weld path.

A stress relief and creep form operation can be performed at step 280K to relieve stresses in the component 260 that may be caused by welding the cover 270 and main body 268. Damping material can be inserted through a vent hole into the recessed region 278 subsequent to step 280K (see vent holes 77 of FIG. 2). One or more finishing operations can be performed at step 280L, including machining external surfaces of the component 260 according to the predefined geometry.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil for a gas turbine engine comprising:
 a first portion welded to a second portion along an interface such that at least the first portion establishes an airfoil section and the second portion establishes a root section mountable to a rotatable hub, the first and second portions being separate and distinct components prior to being welded, and wherein:
the airfoil section includes an airfoil body extending between leading and trailing edges in a chordwise direction, extending between pressure and suction sides separated in a thickness direction, and extending from the root section in a spanwise direction to a tip portion;
a recessed region extends inwardly from at least one of the pressure and suction sides;
the airfoil body includes a plurality of ribs bounding respective pockets within a perimeter of the recessed region, wherein the plurality of ribs are spaced apart from each other and the perimeter of the recessed region, and the recessed region and at least one of the plurality of ribs are dimensioned to extend across the interface; and
a cover skin coupled to the airfoil body along the plurality of ribs to enclose the recessed region.

2. The airfoil as recited in claim 1, wherein the first portion is linear friction welded to the second portion along the interface.

3. The airfoil as recited in claim 1, wherein the cover skin is coupled to the airfoil body along the perimeter of the recessed region.

4. The airfoil as recited in claim 1, wherein the first portion and the second portion are metallic.

5. The airfoil as recited in claim 4, wherein the first portion has a first microstructure, and the second portion has a second microstructure that differs from the first microstructure.

6. The airfoil as recited in claim 1, wherein the tip portion defines a stagger angle relative to the root section, and the stagger angle is greater than or equal to 5 degrees, absolute, prior to welding the first portion to the second portion along the interface.

7. The airfoil as recited in claim 6, wherein the stagger angle is greater than or equal to 15 degrees, absolute, prior to welding the first portion to the second portion along the interface.

8. The airfoil as recited in claim 1, wherein the airfoil is a fan blade.

9. The airfoil as recited in claim 8, wherein:
the first portion and the second portion are formed from wrought metal comprising titanium such that the first portion has a first microstructure and such that the second portion has a second microstructure that differs from the first microstructure; and
the tip portion defines a stagger angle relative to the root section, and the stagger angle is greater than or equal to 10 degrees, absolute, and is less than or equal to 30 degrees, absolute, prior to linear friction welding the first portion to the second portion along the interface.

10. A gas turbine engine comprising:
a fan section including a fan;
a compressor section;
a turbine section that drives the compressor section and the fan; and
a plurality of airfoils, wherein each of the plurality of airfoils includes a first portion welded to a second portion along an interface such that at least the first portion establishes an airfoil section including an airfoil body and the second portion establishes a root section, the first and second portions being separate and distinct components prior to being welded, the airfoil body includes a recessed region and a plurality of ribs bounding respective pockets within a perimeter of the recessed region, wherein the plurality of ribs are spaced apart from each other and the perimeter of the recessed region, and the recessed region and at least one of the plurality of ribs are dimensioned to extend across the interface; and
a cover skin coupled to the airfoil body to enclose the recessed region along one of a pressure side and a suction side of the airfoil section.

11. The gas turbine engine as recited in claim 10, wherein the fan includes a rotatable hub, and the root section of each of the plurality of airfoils is mounted to the hub.

12. The gas turbine engine as recited in claim 11, wherein:
the cover skin is coupled to the airfoil body along the plurality of ribs and along the perimeter of the recessed region.

13. A method of forming an airfoil for a gas turbine engine comprising:
forming a first portion to establish an airfoil section including an airfoil body, the airfoil body extending along a spanwise axis to a tip portion;
forming a second portion to establish a root section;
joining the first portion to the second portion along an interface, the first and second portions being separate and distinct components prior to being joined;
forming a recessed region along a sidewall of the airfoil body subsequent to the step of joining such that the recessed region is dimensioned to extend across the interface;
forming at least one rib in the airfoil body subsequent to the step of joining such that the at least one rib is dimensioned to extend across the interface, the at least one rib bounding a respective pocket within a perimeter of the recessed region; and
coupling a cover skin to the airfoil body to enclose the recessed region.

14. The method as recited in claim 13, wherein the step of joining the first portion to the second portion includes fusion welding the first and second portions to each other along the interface.

15. The method as recited in claim 14, further comprising twisting the airfoil body along the spanwise axis such that the tip portion defines a stagger angle relative to the root section that is greater than or equal to 5 degrees, absolute, prior to the joining step;
wherein the step of forming the first portion includes establishing a first microstructure from wrought metal; and
wherein the step of forming the second portion includes establishing a second microstructure from wrought metal that differs from the first microstructure.

16. The method as recited in claim 13, wherein the step of forming the at least one rib includes forming a plurality of ribs in the airfoil body that are spaced apart from each other and from the perimeter of the recessed region such that the recessed region is divided into a plurality of pockets each bounded by a respective rib of the plurality of ribs.

17. The method as recited in claim 16, wherein:
the step of coupling the cover skin includes welding the cover skin to the plurality of ribs and to the perimeter of the recessed region; and
the step of joining includes welding the first portion to the second portion along the interface, and the step of forming the recessed region occurs subsequent to the step of welding the first and second portions.

18. The method as recited in claim 13, wherein the airfoil is a fan blade.

* * * * *